United States Patent [19]

Tsutsumi

[11] Patent Number: 4,472,055
[45] Date of Patent: Sep. 18, 1984

[54] METHOD AND APPARATUS FOR DETECTING THE FOCUSING POSITION IN A LASER MACHINING APPARATUS

[75] Inventor: Akira Tsutsumi, La Mirada, Calif.

[73] Assignee: Amada Company, Limited, Japan

[21] Appl. No.: 298,329

[22] Filed: Sep. 1, 1981

[30] Foreign Application Priority Data

Sep. 2, 1980 [JP] Japan ............................ 55-124057
Sep. 2, 1980 [JP] Japan ............................ 55-121682

[51] Int. Cl.³ .................... G01B 11/14; H01J 3/14
[52] U.S. Cl. ............................ 356/375; 250/201; 250/237 R; 356/123
[58] Field of Search ............... 356/123, 125–126, 356/375; 250/201, 237 R; 219/121 LU, 121 LZ, 121 LR, 121 LM, 121 LX, 121 LY; 369/45; 358/227; 354/25 R, 25 A, 25 N, 25 D; 365/45

[56] References Cited

U.S. PATENT DOCUMENTS

| 2,524,807 | 10/1950 | Kallmann | 250/201 |
| 3,689,159 | 9/1972 | Taniguchi et al. | 356/123 |
| 3,997,715 | 12/1972 | Elliott | 250/201 |
| 4,009,392 | 2/1977 | Hanley | 356/123 |
| 4,322,616 | 3/1982 | Fukuhara et al. | 354/25 |

FOREIGN PATENT DOCUMENTS

| 2837555 | 3/1980 | Fed. Rep. of Germany | 354/25 N |
| 464796 | 8/1975 | U.S.S.R. | 250/237 R |

OTHER PUBLICATIONS

Frosch et al, "Optical Surface Microtopography Measurement for Automatic Focussing", IBM Tech. Disc. Bull. 7–1972, pp. 504–505.

Primary Examiner—William H. Punter
Attorney, Agent, or Firm—Wigman & Cohen

[57] ABSTRACT

This invention relates to a method and device for detecting the focusing position in a laser processing apparatus, such as a machine for cutting plate-shaped workpieces by laser beams.

The method includes the steps of placing a light shielding member and a light sensor in a path of laser light beams irradiated through a condenser lens to the workpiece to be processed; moving at least either one of the light shielding member and light sensor along the optical axis of the laser beams; and detecting the position at which electrical output of the light sensor becomes either a minimum or a maximum; whereby the focusing position is determined.

The detector device comprises a condenser lens for converging laser beams which pass therethrough; a light shielding member installed along the optical axis of the laser beam between the condenser lens and the workpiece to be processed; a light sensor installed along the optical axis between the light shielding member and the workpiece to be processed; and a support for fitting the light shielding member and the light sensor thereto so that at least either one of the light shielding member and light sensor is installed in a freely movable manner on the support for adjustment purposes along the optical axis.

14 Claims, 6 Drawing Figures

METHOD AND APPARATUS FOR DETECTING THE FOCUSING POSITION IN A LASER MACHINING APPARATUS

BACKGROUND OF THE INVENTION

1. Field of the Invention

The present invention concerns a laser processing apparatus for cutting plate-shaped workpiece by laser beams, and in particular, it is related to an improvement of its workability by correctly detecting its focusing position.

2. Description of the Prior Art

In the laser processing apparatus, it is most important in terms of efficiency and accuracy in processing whether or not the condenser which condenses laser beams is correctly focused on the prescribed position of the workpiece. However, since the light beam used, particularly in the $CO_2$ (carbon dioxide gas) laser processing apparatus, is out of the range of the visible wavelengths, it has been difficult to detect whether the condenser lens is focused on the upper surface of the workpiece. For this reason, the usual practice has been to provide an auxiliary light source of visible rays separately from the laser resonator, and to check whether the visible rays from the auxiliary light source He-Ne laser is correctly focused on the upper surface of the workpiece. In such case, the necessity for the auxiliary light source has made the apparatus more complicated in construction and more expensive in cost. As a result, laser beams are projected intermittently onto the surface of the workpiece, and through visual inspection of the condition of sparks flashing from the workpiece, it is detected whether or not the condenser is correctly focused on the surface of the workpiece. In such case, however, experience and skill are required for operating the apparatus, and the purpose of obtaining correct detection of the focused position has not been fully achieved at that.

SUMMARY OF THE INVENTION

The present invention has been made in view of the foregoing problems in the past.

The primary object of the invention is to provide a method and an apparatus that can very easily detect the focusing position of laser beams regardless of whether they are visible or invisible rays.

The secondary object of the invention is to provide a laser processing apparatus with improved cutting accuracy and efficiency by achieving correct focusing of laser beams on the prescribed position of the work through detection of the focused position.

Other and further objects and advantages of the present invention will be made clearer with the explanation of a preferred embodiment of the invention by referring to the accompanying drawings.

In order to attain the foregoing objects, the present invention is provided with an adjustable light shielding member which shields a part of laser beams, and sequentially-arranged light sensors which produce outputs in proportion to the quantities of laser beams, and at least either one of the light shielding member or the light sensors is moved in the direction of the optical axis. The position at which the outputs of the aforesaid light sensors become maximum or minimum is detected, thereby making it possible to detect the correct focusing position.

DESCRIPTION OF PREFERRED EMBODIMENT

Figure 1:
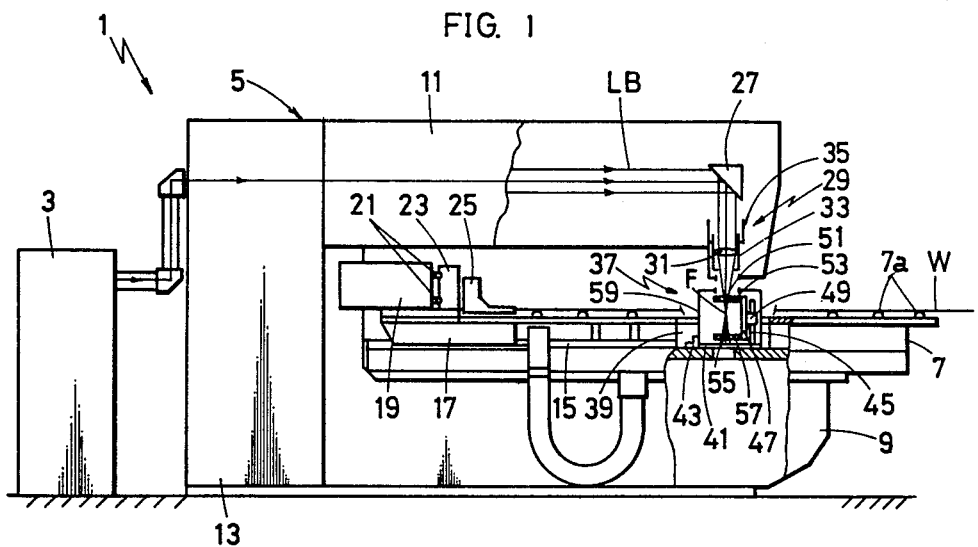
FIG. 1 is a side view showing roughly the cross section of the important part of a laser processing apparatus embodying the mechanism of the present invention.
Figure 2:
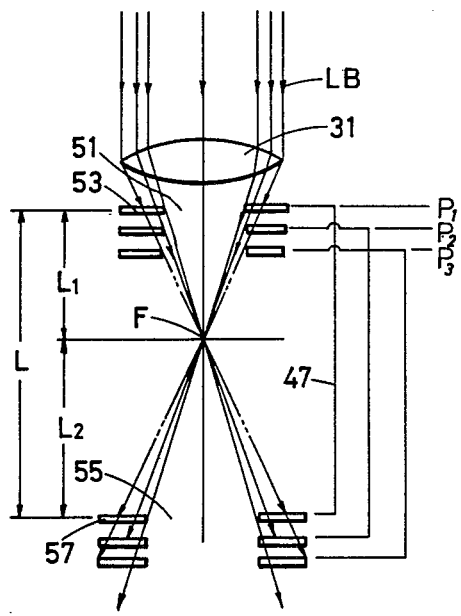
FIG. 2 and FIG. 3 are explanatory plans showing the principles of detecting the focusing position of the condenser lens.

Referring to FIGS. 1 and 2, the laser processing apparatus 1 comprises, a laser resonator 3, such as a $CO_2$ (carbon dioxide gas) laser resonator, and a processing unit 5 of a C-shaped frame. Since the laser resonator 3 may be a usual commercially available one, no particular description will be necessary for the detailed structure thereof.

The processing unit 5 comprises a base or lower frame 9 for the support of a table 7 that movably supports on its upper surface of a plate-like workpiece W, an overhead beam upper frame 11 located above the base 9 and a vertical column 13 joining the base 9 and the overhead beam 11 in a configuration of a letter C.

Figure 3:
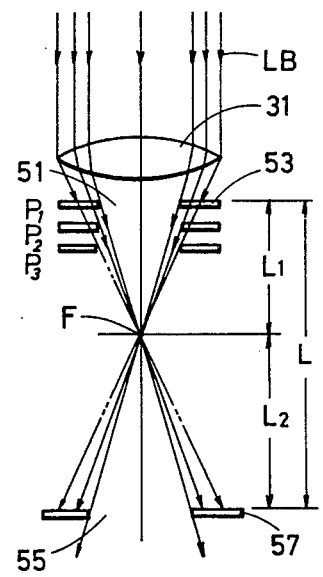

A plurality of friction reducing means 7a equipped with rotatable steel balls are mounted on the upper surface of the table 7 for smoothly supporting the workpiece W. On both sides of the base 9 (on both front and rear sides in the drawing of FIG. 3) there are attached a pair of Y-axis guide bars 15 horizontally extending therealong (left- and right-wardly in FIG. 1), and a pair of Y-axis carriages 17 movable in the left- and rightward directions along the Y-axis guide bars 15. The pairs of Y-axis carriages 17 guide bars 15. Both of the Y-axis carriages 17 are integrally connected with each other by a connection member 19 that extends in the direction perpendicular to the Y-axis guide bar 15) with a slight gap being kept relative to the upper surface of the table 7. Accordingly, both of the Y-axis carriages 17 are integrally moved in the direction of axis Y (right- and left-wardly in FIG. 1).

The connection member 19 is mounted with an X-axis guide bar 21 extending in the direction of axis X perpendicular to the Y-axis guide bars 15 and the X-axis guide bar 21 is provided with an X-axis carriage 23 movable along the X-axis guide bar 21. A plurality of work clamps which are capable of clamping the end portion of the workpiece W are movably supported on the surface of the table 7 and are mounted in an appropriate number to the X-axis carriage 23. Accordingly, by moving the X-axis carriage 23 appropriately along the X-axis guide bar 21, the workpiece W is moved in the direction of the X axis while clamped in the work clamp 25. In this wy, the workpiece W can suitably be moved and positioned both in the directions of X-axis and Y-axis by moving the Y-axis carriage 17 in the direction of the Y-axis and the X-axis carriage 23 in the direction of the X-axis.

In this connection, it will be understood that the Y-axis carriages 17 and the X-axis carriage 23 can be automatically moved and stopped along the Y and X axes under the control of a suitable control device, such as a numerical control device or a computer (not shown), to position the workpiece W in the X and Y axes.

In the vicinity of the end portion of said upper frame 11, beam bender (reflector) 27 is installed which refracts laser beams LB from said laser resonator 3 vertically with respect to the surface of table 7. At an appropriate lower portion of the beam reflector 27, focusing position adjuster 29 is installed. This adjuster 29 adjusts laser beams LB to be condensed on a microspot onto the surface of workpiece W when laser beams LB are projected on the surface of the workpiece W. This focusing position adjuster 29 is provided with lens holding cylinder 33, which holds condenser lens 31 for condensing or converging said laser beams LB, and this lens holding cylinder 33 is connected, by means of an appropriate connector such as thread coupling, with external cylinder 35 fitted to the upper frame 11, so that its motion can be freely adjusted in the vertical direction (in the direction of the vertical optical axis of laser beams LB.) Consequently, even if the plate thickness of the workpiece W is changed, focus F of condenser lens 31 can be placed on the surface of workpiece W at all times by adjusting properly the position of lens holding cylinder 33 in the up-to-down direction. Although it is not shown in FIG. 1, a nozzle is installed in the focusing position adjuster 29 for the purpose of jetting gas in the direction of the laser machining position (weld-cutting) of workpiece W.

As stated above, by projecting the laser beams LB from the laser resonator device 3 to the workpiece W on the table 7, and by jetting gas from the nozzle and by properly moving the workpiece W in the directions of the X and Y, axes the workpiece W can be laser cut into an appropriate configuration.

Since it is difficult to detect whether or not laser beams LB are condensed into a micro-spot on the surface of workpiece W, the present invention is arranged so that focusing position detector 37 is installed on said table 7 and the focusing position of said condenser lens 31 can be very easily detected.

Said focusing position detector 37 is detachably installed to said lower frame 9 of table opening 39 which is fitted on said table 7, facing toward said focusing position adjuster 37. Namely, on lower frame 8 in said table opening 39, base plate 41 is installed in a detachable state, and also several positioning stoppers 43 are fixed securely which are used for positioning base plate 41. Said positioning stoppers 43 position the base plate 41 in the way explained later. On said plate 41, guide post 45 is installed perpendicularly, and support member 47 is installed on guide post 45 by way of bracket 48 in such a way as to allow free position adjustment in the up-to-down direction. As connecting mechanisms for fitting said support member 47 to said guide post 45, there are several methods that can be employed, such as by bolting said bracket 49 to guide post 45 or by thread copling of a threaded rod (not shown)—which is supported perpendicularly to guide post 45 in a freely rotatable state—to guide post 45. Therefore, detailed explanation is omitted here for the mechanism of fitting support member 47 to guide post 45 in freely adjustable positions.

In the vicinity of the upper part of said support member 47, light shielding member 53 is installed which is provided with permeation hole 51 of such a shape through which laser beams LB, condensed by said condenser 31, can freely pass. The shape of permeation hole 51 of said light shielding member need not be a circular shape, but may be a polygon, but it is desirable that the hole be a circle of a diameter smaller than that of condenser lens 31.

Said light shielding member 53 can be freely installed between said condenser lens 31 and focus F of this condenser lens 31, and also can be freely moved for adjustment in the direction of the optical axis of laser beams LB. In order to adjust the motion of light shielding member 53 in said direction of the optical axis, the position of support member 47 is adjusted by moving it along guide post 45, as mentioned earlier. This adjustment also can be made by moving light shielding member 53 in the up-to-down direction with respect to said support member 47. Regarding the mechanism for adjusting the motion of light shielding member 53 in the up-to-down direction with respect to said support member 47, any appropriate method can be employed, such as the thread-coupling of light shielding member 53 in a freely movable sate to a threaded rod (not shown) which is supported by support member 47 perpendicularly and in a freely rotatable state.

In the vicinity of the lower part of said support member 47, light sensor 57 is properly installed which is provided with permeation hole 55 having a shape analogous to said permeation hole 51 provided on said light shielding member 53. This light sensor 57 consists of an appropriate light-sensing element such as a photoelectric element, and produces electrical output proportionally to the quantity of light of the irradiated laser beams LB.

Said light sensor 57 is positioned to face said light shielding member 53 on the opposite side of condenser lens 31 with focus F of said condenser lens 31 as a boundary, and can be moved freely in the direction of optical-axis of laser/beams LB. In order to move for adjustment the light sensor 57 in the said optical-axis direction, support member 47 is moved for adjustment along guide post 45. In such case, said light sensor 57 is moved for adjustment together with said light shielding member 53 by way of support member 47. By moving light sensor 57 for adjustment in the up-to-down direction with respect to said support member 47, it is also possible to move light sensor 57 for adjustment. Regarding the mechanism for moving light sensor 57 in the up-to-down direction with respect to said support member 47, any appropriate method can be employed, such as the thread-coupling of light sensor 57 in a freely movable state to the threaded rod (not shown) which is supported by support member 47 perpendicularly and in a freely rotatable state.

When said stopper 43 places said base plate 41 on lower frame 9 in said table opening 39 and positions base plate 41 to come into contact with stopper 43, this stopper 43 will align both the center of permeation hole 51 provided on said light shielding member 53 and that of permeation hole 55 provided on light sensor 57 with the perpendicular optical axis of laser beams LB. Therefore, when base plate 41 is positioned in contact with stopper 43, centers of permeation holes 51 and 55 which are provided on light shielding member 53 and light sensor 57 respectively will align with the perpendicular optical-axis of laser beams LB. Said light shielding member 53, light sensor 57 and its support member 47 are covered by cover 59; and on top of this cover, 59 an opening is provided which is large enough for laser beams LB to pass through.

The positional relationship between said light shielding member 53 and said light sensor 57 is as follows (refer to FIG. 20): Distance L between light shielding member 53 and said light sensor 57 is divided internally according to the ratio between said permeation holes 51 and 55 to obtain lengths $L_1$ and $L_2$. When both positions $L_1$ and $L_2$ are aligned with the position of focus F of condenser lens 31, laser beams LB, which pass first through the inner circumferential face of permeation hole 51 of light shielding member 53 and then through the inner circumferential face of permeation hole 55 of light sensor 57, will not be irradiated on the said light sensor 57 and its output will become a minimum (for instance 0). Therefore, when light sensor 57 moves together with light shielding member 53 coupled thereto by way of support member 47, as light shielding member 53 gradually moves from position $P_1$ towards positions $P_2$ and $P_3$ as shown in FIG. 2, the quantity of light laser beams LB which are irradiated on light sensor 57 gradually increases, thereby causing light sensor 57 to produce electrical output proportionally to the quantity of light of laser beams LB. Similarly, when either one of light shielding member 53 or light sensor 57 is moved, for instance, when only light shielding member 53 is moved from position $P_1$ towards positions $P_2$ and $P_3$ (this is applicable when only light sensor 57 is moved downward in FIG. 3), the quantity light of laser beams LB irradiated on light sensor 57 will gradually increase and light sensor 57 produces electrical output proportionally to the quantity of light.

Consequently, if the position at which the output of light sensor 57 becomes minimum is detected, and distance L between light shielding member 53 and light sensor 57 at the time of this detection is internally divided into lengths $L_1$ and $L_2$ according to the ratio between permeation hole 51 provided on light shielding member 53 and permeation hole 55 provided on light sensor 57, then it is possible to detect the position of focus F of condenser lens 31, regardless of whether laser beams LB are visible or invisible rays. Namely, it is possible to know the height from the position of focus F to the surface of said table 7 or from the position of focus F to the surface of lower frame 9.

As a result, it becomes very easy to place focus F of condenser lens 31 on the surface of workpiece W, by employing the following method; Namely, divide internally the distance L between said light shielding member 53 and light sensor 57 depending upon the position of focus F of condenser lens 31 and in accordance with the ratio between permeation holes 51 and 55 provided on light shielding member 53 and light sensor 57 respectively, to determine the point where $L_1$ and $L_2$ meet, and make setting beforehand until the positions of lengths $L_1$ and $L_2$ are aligned with the position of focus F of condenser lens 31. Next, place base plate 41 inside table opening 39, so that the position where $L_1$ and $L_2$ meet is aligned with the surface of workpiece W to be mounted on table 7. Finally, move the lens holding cylinder 33 in said focusing position adjuster 29 properly in up-to-down adjustment and adjust condenser lens 31 to the position where the output of light sensor 57 gradually decreases until it becomes a minimum. Then the position of focus F of condenser lens 31 will be aligned with lengths $L_1$ and $L_2$, which have been obtained by internally dividing distance L between said light shielding member 53 and light sensor 57 according to the ratio between permeation holes 51 and 55 of the respective units, and focus F will be placed properly on the surface of workpiece W mounted on the surface of table 7.

After the position of focus F of condenser lens 31 is detected or the position of said focus F is placed on the prescribed position, such as the surface of workpiece W mounted on table 7 as mentioned above, said focusing position detector 37 is removed from the position in table opening 39, or is lowered below the surface of table 7 and moved away from the optical-axis of laser beams LB to a shunted position in a linear or rotary motion, in order to avoid interference with workpiece W to be laser-processed (mainly cutting). Next, workpiece W is mounted on table 7, clamped with work clamp 25 and moved properly into position in the X-axis and Y-axis directions for laser machining. Regarding the mechanism of moving the focusing position detector 37 from the position of optical axis of the laser beams LB to a suitable shunted position, many methods are conceivable, and for the details of such mechanisms, explanation is omitted here.

Further, when focusing position detector 37 is used for detecting or adjusting the position of focus F of condenser lens 31 as mentioned above, it is desirable to lower the output of said laser resonator 3 or to insert proper attenuating means such as a slit plate or a half-mirror in the path of laser beams LB from laser resonator 3 to focusing position adjuster 29, thereby attenuating the energy of laser beams LB which are to be irradiated on light sensor 57.

In the preceding embodiment, the position which makes output of light sensor 57 a minimum is detected for the focusing position, but conversely, it is also possible to detect the focusing position by detecting the position where the output of light sensor 57 becomes a maximum, by employing the following procedure.

Figure 4:
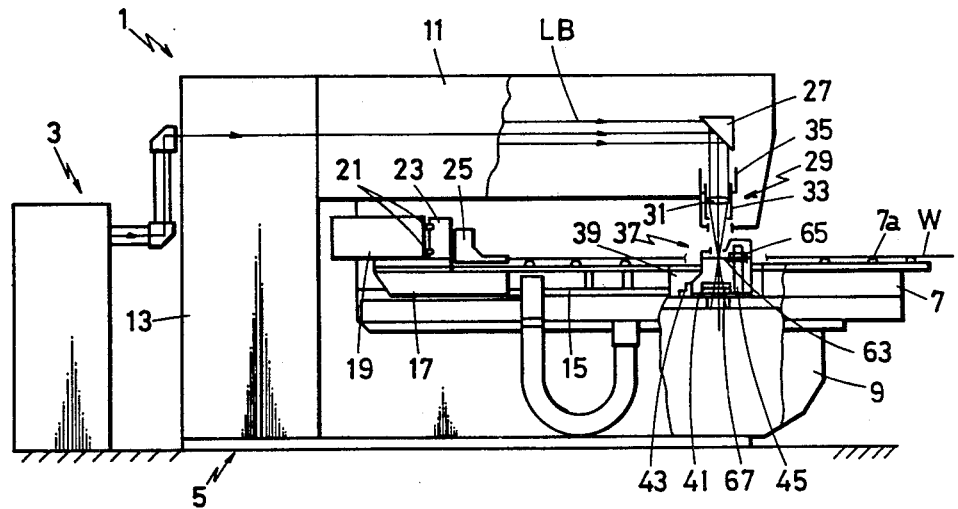
FIG. 4 is a side view of the secondary embodiment roughly showing its cross section.

Namely, as shown in FIG. 4, plate-shaped annular material 63 is provided with a small hole 61 (refer to FIG. 5) which allows free passage of laser beams LB and is installed on guide post 45 erected on base plate 41, by way of bracket 65, in a freely adjustable state in the up-to-down direction (optical-axis direction). Then light sensor 67, which produces electrical output proportionally to the quantity of light of laser beams LB that have passed through small hole 61 of said annular member 63, is installed on base plate 41. Incidentally, components shown in FIG. 4 which have the same functions as in the embodiment shown in FIG. 1 have been given the same reference numerals as those in FIG. 1.

When the second embodiment shown in FIG. 4 is adopted, the following steps will occur: After annular member 63 is moved properly in the up-to-down direction along guide post 45 and so adjusted until the top face of annular member 63 is aligned with the surface of workpiece W mounted on the top face of table 7, laser beams LB are projected on focusing position adjuster 29 and, after passing through small hole 61 of annular member 63, are irradiated on light sensor 67. Consequently, light sensor 67 can produce output proportionally to the quantity of light of laser beams LB irradiated.

Figure 5:
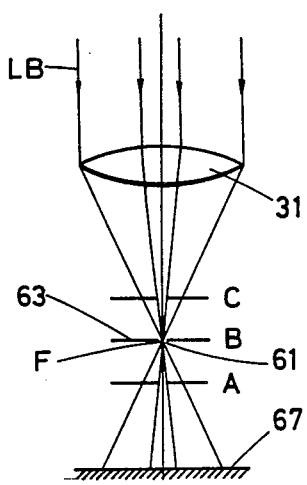
FIG. 5 is an explanatory plan showing the quantity of laser beams that can pass through depending upon the positional relationship between the condenser lens and the light shielding member.
Figure 6:
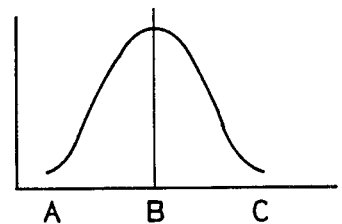
FIG. 6 is an explanatory plan showing the relationship of the relative position between the condenser lens and the light shielding member to the output of laser beam sensors.

Now when the focusing position of condenser lens 31 in said focusing position adjuster 28 and small hole 61 of annular member 53 are aligned (in Position B in FIG. 5), all laser beams LB through the condenser lens are irradiated on light sensor 57, as shown in FIG. 5. Whereas if the focusing position of said condenser lens 31 is not aligned with small hole 61 of said annular member 63 (Positions A, and C in FIG. 5), only a part of laser beams LB which have passed through said condenser lens 31 is irradiated on light sensor 67, as clearly shown in FIG. 5. Thus, when the positional relationship between condenser lens 31 and annular member 63 is set on the X-axis and the output of light sensor 67 is set on the Y-axis, the output of light sensor 67 is expressed as shown in FIG. 6. Therefore, if lens holding cylinder 33 in focusing position adjuster 29 is moved in the up-to-down direction while an operator is watching an instrument panel (not shown) connected to light sensor 67, adjustment is made by the operator so that output at light sensor 67 will become a maximum. Thus, it is possible to place the focusing position of condenser lens 31 properly on workpiece W to be processed.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A method for adjusting the focusing position in a laser apparatus for processing a workpiece, comprising the steps of:
    (a) moving adjustably a light shielding member in the direction of the optical axis downstream of an adjustable condenser lens, said light shielding member having a substantially circular hole in the center thereof to pass a light of laser;
    (b) removably placing a light sensor having a substantially circular hole in the center thereof downstream of said light shielding member to detect the laser light;
    (c) aligning a predetermined point between said light shielding member and said light sensor at a point where the focus of the laser beams is desired;
    (d) adjusting said condenser lens in the direction of the optical axis in response to the amount of light irradiating said sensor; and
    (e) moving the light sensor away when the operation is complete.

2. The method according to claim 1, wherein said focusing position is adjusted at which electrical output of the light sensor becomes a minimum.

3. The method according to claim 1, wherein said light shielding member is moved along the optical axis and the focusing position is adjusted at which electrical output of the light sensor becomes a minimum.

4. The method according to claim 1, wherein said light sensor is moved along the optical axis and the focusing position is adjusted at which electrical output of the light sensor becomes a minimum.

5. The method according to claim 1, wherein both said light shielding member and said light sensor are moved along the optical axis and the focusing position is adjusted at which electrical output of the light sensor becomes a minimum.

6. A detector for adjusting the focusing position of a laser apparatus for processing a workpiece, comprising:
    (a) a condenser lens means for converging laser beams which pass therethrough, said lens being adjustable in the direction of the optical axis;
    (b) a light shielding member having a substantially circular hole in the center thereof adjustably installed along the optical axis of the laser beam between the condenser lens means and the location where the workpiece is processed;
    (c) a light sensor having a substantially circular hole in the center thereof installed along the optical axis downstream of the light shielding member and downstream of the location where said workpiece is processed; and
    (d) a support means to which the light shielding member and the light sensor are attached thereto, the support means being movable for adjustment purposes along the optical axis;
    whereby the focusing position in the laser processing apparatus is adjusted by aligning a predetermined point between said light shielding member and said light sensor at a point where the focus of the laser beams is desired, and adjusting said condenser lens in response to the amount of light irradiating said sensor.

7. A detector for determining the focusing position in a laser apparatus for processing a workpiece, comprising:
    (a) a condenser lens means for converging laser beams which pass therethrough said lens being adjustable in the direction of the optical axis;
    (b) a light shielding member having a substantially circular hole in the center thereof adjustably installed along the optical axis of the laser beam between the condenser lens means and the location where the workpiece is processed;
    (c) a light sensor having a substantially circular hole in the center thereof installed along the optical axis downstream of the light shielding member and downstream of the location where said workpiece is processed; and
    (d) a support means to which the light shielding member and the light sensor are attached thereto, the support means being movable for adjustment purposes along the optical axis;
    whereby the focusing position in the laser processing apparatus is at a predetermined point between said light shielding member and said light sensor when the electrical output of said sensor is at a minimum.

8. A detector according to claim 7, wherein only the light shielding member is installed in a freely movable manner on the support means for adjustment purposes along the optical axis.

9. A detector according to claim 7, wherein only the light sensor is installed in a freely movable manner on the support means for adjustment purposes along the optical axis.

10. A detector according to claim 7, wherein both the light shielding member and the light sensor are installed in a freely movable manner on the support means for adjustment purposes along the optical axis.

11. A detector according to claim 7, wherein said light shielding member and said light sensor are attached to said support means such that said light shielding member and said light sensor are maintained in fixed relation to each other.

12. A method for determining the focusing position in a laser apparatus for processing a workpiece, comprising the steps of:
    (a) moving a condenser lens adjustably in the direction of the optical axis of a path of laser light beams;
    (b) moving adjustably a light shielding member in the direction of the optical axis downstream of said condenser lens, said light shielding member having a substantially circular hole in the center thereof to pass a light of laser;
(c) removably placing a light sensor having a substantially circular hole in the center thereof downstream of said light shielding member to detect the light beams;
(d) adjusting the position of said light shielding member and said light sensor along the light beam path until the output of the light sensor becomes a minimum, whereby the focusing position in the laser processing apparatus will be at a predetermined point between said light shielding member and said light sensor; and
(e) moving the light sensor away when the operation is complete.

13. A method for adjusting the focusing position in a laser apparatus for processing a workpiece, comprising the steps of:
(a) aligning an annular member provided with a small hole therein, in a path along which freely passes laser light beams irradiated from a condenser lens at a predetermined location where the workpiece is processed;
(b) placing a light sensor in said path downstream of the location where said workpiece is to be processed;
(c) moving the condenser lens along the optical axis of the laser beams; and
(d) detecting the position at which electrical output of the light sensor becomes a maximum;
whereby the focusing position in the laser processing apparatus is adjusted.

14. A detector for adjusting the focusing position in a laser apparatus for processing a workpiece, comprising:
(a) a condenser lens means for converging laser beams which pass therethrough adjustably installed along the path of the laser beams;
(b) an annular member, provided with a small hole therein, adjustably installed along the optical axis of the laser beams at the location where the workpiece is processed;
(c) a light sensor installed along the optical axis downstream of the annular member; and
(d) a guide post means for fitting the annular member thereto so that the annular member is installed in a freely movably manner on the guide post means for adjustment purposes along the optical axis;
whereby the focusing position in the laser apparatus is adjusted by aligning the annular member at the location where the workpiece is to be processed, and adjusting the condenser lens until the output of said sensor is at a maximum.

* * * * *